United States Patent [19]

Cunningham et al.

[11] Patent Number: 4,814,383
[45] Date of Patent: Mar. 21, 1989

[54] HIGH IMPACT BLENDS AND FILMS OF LINEAR POLYETHYLENE, POLYPHENYLENE OXIDE AND STYRENE RESIN

[75] Inventors: Theresa L. Cunningham, Manalapan, N.J.; Richard G. Shaw, Remsen, N.Y.; Tien-Kuei Su, Belle Mead, N.J.

[73] Assignee: Mobil Oil Corporation, New York, N.Y.

[21] Appl. No.: 139,411

[22] Filed: Dec. 30, 1987

[51] Int. Cl.$^4$ ................................................ C08F 8/00
[52] U.S. Cl. .................................. 525/133; 428/500; 525/132
[58] Field of Search ................. 525/132, 133; 428/500

[56] References Cited

U.S. PATENT DOCUMENTS

| | | | |
|---|---|---|---|
| 3,257,357 | 6/1966 | Stamatoff | 260/47 |
| 3,257,358 | 6/1966 | Stamatoff | 260/47 |
| 3,306,874 | 2/1967 | Hay | 260/47 |
| 3,306,875 | 2/1967 | Hay | 260/47 |
| 3,361,851 | 1/1968 | Gowan | 524/343 |
| 3,383,435 | 5/1968 | Cizek | 525/132 |
| 4,454,284 | 6/1984 | Ueno et al. | 525/133 |
| 4,528,327 | 7/1985 | Cooper et al. | 525/68 |
| 4,579,912 | 4/1986 | Canterino et al. | 525/133 |

*Primary Examiner*—Edith Buffalow
*Attorney, Agent, or Firm*—Alexander J. McKillop; Charles J. Speciale; Michael J. Mlotkowski

[57] ABSTRACT

Composition and films of linear ethylene polymers such as linear low density polyethylene containing up to about 3 weight percent of a blend of polyphenylene oxide and styrene resin exhibit excellent physical properties particularly impact strength.

10 Claims, No Drawings

HIGH IMPACT BLENDS AND FILMS OF LINEAR POLYETHYLENE, POLYPHENYLENE OXIDE AND STYRENE RESIN

BACKGROUND OF THE INVENTION

Linear ethylene polymers, particularly linear low density polyethylene (LLDPE) are widely used commercially in films. The films are conventionally prepared by blown film extrusion and have generally good properties. Considerable effort has been devoted to improving one or more of the physical properties by blending the LLDPE with other resins, or by other means. For example, U.S. Pat. No. 4,579,912, which is incorporated by reference, discloses the use of polystyrene or poly(para-methylstyrene) to improve tear strength. It was subsequently found that the addition of polystyrene resin also improved the blocking characteristics and reduced the splittiness as measured by machine direction puncture propagation of the film making it particularly suitable for bags and the like.

In a separate body of research, as disclosed in U.S. Pat. No. 3,383,435, which is also incorporated by reference, it was discovered that the excellent physical properties of polyphenylene oxide (PPO) resins can be largely retained but that its processability can be improved significantly by blending with polystyrene. Thus, U.S. Pat. No. 3,383,435 discloses blends of 1 to 99 weight percent polyphenylene oxide and 1 to 99 weight percent of a styrene resin which is a resin containing 25 percent or more of styrene or a substituted styrene.

This invention is based on the discovery that blending linear polyethylene with a mixture of polyphenylene oxides (PPO) and a styrene resin as disclosed in U.S. Pat. No. 3,383,435, gives a composition having excellent impact strength.

SUMMARY OF THE INVENTION

The compositions and films of this invention comprise a linear ethylene polymer such as linear low density polyethylene and a small amount of a mixture of 1 to 99 weight percent of a polyphenylene oxide and 1 to 99 weight percent of a styrene resin.

DETAILED DESCRIPTION OF THE INVENTION

The major component of the compositions and films of this invention is a linear polymer of ethylene having a density of from about 0.85 to about 0.96 and can be a homopolymer or a copolymer. Suitable copolymers are copolymers of ethylene and alpha-olefins containing 4 to 10 carbon atoms. Polymers having a density between 0.90 and 0.94, preferably between 0.91 and 0.93, referred to as linear low density polyethylenes, (LLDPE) are particularly suitable. Copolymers of ethylene and 1-butene, 1-hexene, 1-octene and 4-methyl-1-pentene are commercially important, and widely available.

The minor component present in the blends of this invention is itself a blend of 1 to 99 weight percent preferably 40 to 85 weight percent, of a polyphenylene oxide and 1 to 99 weight percent, preferably 60 to 15 weight percent a styrene resin. Suitable blends are disclosed in U.S. Pat. Nos. 3,383,435, 4,373,064 and 4,528,327 all of which are incorporated by reference. Such blends are also commercially available in a variety of grades as NORYL (TM) from General Electric.

The styrene component is preferably crystal polystyrene or high impact polystyrene, but can be any of the polymers under the definition of styrene resin in U.S. Pat. N. 3,383,435.

Similarly, the polyphenylene oxide (or polyphenylene ether) component is as defined in U.S. Pat. No. 3,383,435 in which the phenylene radical can be, and is preferably one containing alkyl, preferably methyl, substituents ortho to the ether oxygen atoms. Suitable polyphenylene oxides are disclosed in U.S. Pat. Nos. 3,306,874, 3,306,875, 3,257,357 and 3,257,358, all of which are incorporated herein by reference.

The blend of styrene resin and polyphenylene oxide can be added to the linear ethylene polymer in any suitable manner. It can be advantageous to prepare a masterbatch rich in the blend of styrene resin and polyphenylene oxide and containing a small amount of the linear ethylene polymer for subsequent blending with additional ethylene polymer to achieve the desired proportions.

The compositions of this invention when formed into articles such as films exhibit a good balance of physical properties particularly impact strength such as total energy dart drop.

The invention is illustrated by the following non-limiting examples in which all parts are by weight unless otherwise specified.

EXAMPLES 1-4

Linear low density polyethylene (hexene-copolymer, 1 MI, 0.920 density) was blended with 3 weight percent of several different grades of NORYL (blends of polyphenylene oxide and styrene resin). A 1⅜ inch twin screw Brabender extruder was used to first melt blend the components and pelletize the resulting mixture. Film was prepared on the laboratory ¾ inch Brabender blown film line at a thickness of 1.5 mil. The films were evaluated for Elmendorf tear, total energy dart drop and 1% secant modulus. A significant increase in impact strength, as measured by total energy dart drop, with only a slight decrease in tear strength was observed. Results are summarized in the Table.

TABLE

| Example NORYL Grade | Control | 1 FN 215 | 2 PC180 | 3 N 190 | 4 731 |
| --- | --- | --- | --- | --- | --- |
| Elmendorf Tear MD g/mil TD | 486 642 | 388 628 | 467 636 | 361 593 | 405 632 |
| TEDD, in.-lb. | 18.7 | 23.9 | 23.3 | 20.7 | 32.7 |
| MD 1% Secant Modulus, psi | 31,500 | 30,000 | 31,000 | 30,900 | 30,800 |

NORYL FN 215 is a structural foam grade

NORYL PC 180 is a computer and business equipment grade

NORYL N 190 is an injection molding grade (34% styrene resin, 44% PPO)

NORYL 731 is an injection molding grade (44% styrene resin, 48% PPO)

We claim:

1. A composition comprising:
   (a) a linear ethylene polymer, and up to about 3 weight percent
   of a blend of;
   (b) 40 to 85 weight percent of a polyphenylene oxide and;
   (c) 60 to 15 weight percent of a styrene resin.

2. The composition of claim 1 in which said linear polyethylene polymer is a copolymer of ethylene and a higher olefin containing 4 to 10 carbon atoms, having a density of 0.90 to 0.94.

3. The composition of claim 1 in which said linear polyethylene is a copolymer of ethylene and butene having a density of 0.90 to 0.94.

4. The composition of claim 1 in which said linear polyethylene is a copolymer of ethylene and hexene having a density of 0.90 to 0.94.

5. The composition of claim 1 in which said linear polyethylene is a copolymer of ethylene and octene having a density of 0.90 and 0.94.

6. A film comprising:
   (a) a linear ethylene polymer, and up to about 3 weight percent of a blend of;
   (b) 40 to 85 weight percent of a polyphenylene oxide and;
   (c) 60 to 15 weight percent of a styrene resin.

7. The film of claim 6 in which said linear polyethylene polymer is a copolymer of ethylene and butene having a density of 0.90 to 0.94.

8. The film of claim 6 in which said linear polyethylene is a copolymer of ethylene and butene having a density of 0.90 to 0.94.

9. The film of claim 6 in which said linear polyethylene is a copolymer of ethylene and hexene having a density of 0.90 to 0.94.

10. The film of claim 6 in which said linear polyethylene is a copolymer of ethylene and octene having a density of 0.90 to 0.94.

* * * * *

UNITED STATES PATENT AND TRADEMARK OFFICE
CERTIFICATE OF CORRECTION

PATENT NO. : 4,814,383

DATED : March 21, 1989

INVENTOR(S) : T.L. Cunningham et al.

It is certified that error appears in the above-identified patent and that said Letters Patent is hereby corrected as shown below:

Col. 1, line 67    insert --resin-- between "styrene" and "component"
Col. 2, line 7    "atoms" should be --atom--
Col. 3, Claim 5,
  line 3,    "and" should be --to--

Signed and Sealed this

Nineteenth Day of December, 1989

Attest:

JEFFREY M. SAMUELS

*Attesting Officer*    *Acting Commissioner of Patents and Trademarks*